United States Patent [19]
Biren

[11] Patent Number: 4,511,222
[45] Date of Patent: Apr. 16, 1985

[54] INSPECTION PERISCOPE

[75] Inventor: Marvin A. Biren, Chestnut Hill, Mass.

[73] Assignee: The Charles Stark Draper Laboratory, Inc., Cambridge, Mass.

[21] Appl. No.: 359,916

[22] Filed: Mar. 19, 1982

Related U.S. Application Data

[63] Continuation of Ser. No. 118,415, Feb. 4, 1980, abandoned.

[51] Int. Cl.³ .............................................. G02B 23/08
[52] U.S. Cl. .................................... 350/441; 350/96.1
[58] Field of Search ....................... 350/441, 444, 96.1

[56]   References Cited
   U.S. PATENT DOCUMENTS 3,073,210   1/1963   Packard ............................... 350/441
3,283,653  11/1966   Tokarzewski ........................ 350/441
3,413,067  11/1968   Froio .................................. 350/96.1

Primary Examiner—John K. Corbin
Assistant Examiner—Rebecca D. Gass
Attorney, Agent, or Firm—Weingarten, Schurgin, Gagnebin & Hayes

[57] ABSTRACT

An annular inspection lens is described for viewing obscured internal cylindrical surfaces. This annular lens provides a projected image of the internal cylindrical surface in all directions simultaneously and uses ambient light for illumination.

10 Claims, 5 Drawing Figures of FIG. 2;

INSPECTION PERISCOPE

This is a continuation of application Ser. No. 118,415, filed Feb. 4, 1980 now abandoned.

FIELD OF THE INVENTION

The present invention relates in general to inspection systems for obscured surfaces and in particular to an inspection lens for viewing an internal cylindrical surface which is substantially at right angles to a bore or cavity.

BACKGROUND OF THE INVENTION

Components such as high performance electrical connectors typically have one or more sets of cylindrical shells which mate with recesses when male and female parts are joined. Means for focussed visual inspection with ambient light of the recesses are necessary to, for example, verify the operative status of contacts inside them. Manipulation of parts in or near the recesses may also be desired during inspection. These features have not previously been provided by known instruments for viewing the internal surfaces. For example, in Alsberg, U.S. Pat. No. 4,072,427, an inspection system is described using a cylinder having a separate lens and mirror system and requiring a specific source of illumination. Similarly, in Troeo, U.S. Pat. No. 3,413,067 and Jones, U.S. Pat. Nos. 4,135,824 and 3,724,922, rod like endoscopes are provided for viewing internal surfaces. None of these, however, provide an annular instrument capable of insertion in a cylindrical recess which has magnifying power, provides a clear in-focus view of the entire internal cylindrical surface simultaneously, and uses ambient external light for illumination.

SUMMARY OF THE INVENTION

An inspection lens for viewing internal cylindrical surfaces is provided comprising an optically transparent solid cylinder having a central aperture surrounded by an inner side wall, an outer side wall and first and second annular end surfaces. The first annular end surface comprises a conical or spherical polished surface extending between the inner side wall and outer side wall and forms an optical surface able to reflect an in focus image through the solid cylinder towards the second annular end surface. The second annular end surface comprises a polished surface for focused viewing of the reflected images. The combination forms a catadioptic solid optic system.

It is an object of the present invention to provide an inspection lens which permits observation of an internal cylindrical surface in all directions simultaneously and which can provide a clear, focused, precise, and accurate image.

It is also an object of this invention to provide an annular lens which enables the viewer to insert instruments centrally through the lens to regions near the area being viewed.

DETAILED DESCRIPTION OF THE DRAWING

The inspection lens comprising the present invention may be more fully understood from the following, exemplary detailed description taken in conjunction with the accompanying drawings, in which.

DETAILED DESCRIPTION OF THE INVENTION

The present invention contemplates an annular inspection lens which permits observation of hidden or obscured internal cylindrical surfaces through cylindrical recesses and of the components disposed thereon, substantially at right angles to the cylindrical axis of the inspection lens itself.

Figure 1:
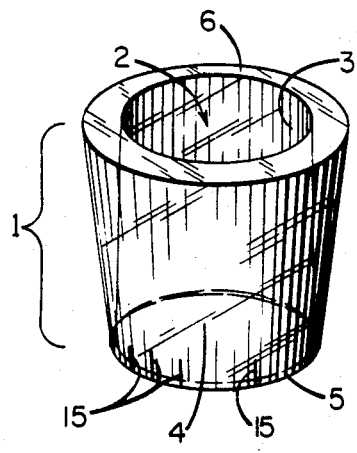
FIG. 1 is a pictorial view of the preferred embodiment of the present invention.

Referring to FIG. 1, there is shown the preferred embodiment of the present invention. An elongated cylinder 1 of optical glass or plastic has an aperture 2 through its central longitudinal axis to form a circular inner side wall 3, a circular outer side wall 4, and first and second annular end surfaces 5 and 6. The side walls 3 and 4 may be parallel, but preferably, the cylinder 1 thickness expands slightly between ends 5 and 6 to enhance light gathering and to accomodate image magnification. The cylinder 1 is composed of optically transparent material which is suitable for finishing to an optical surface.

Figure 2:
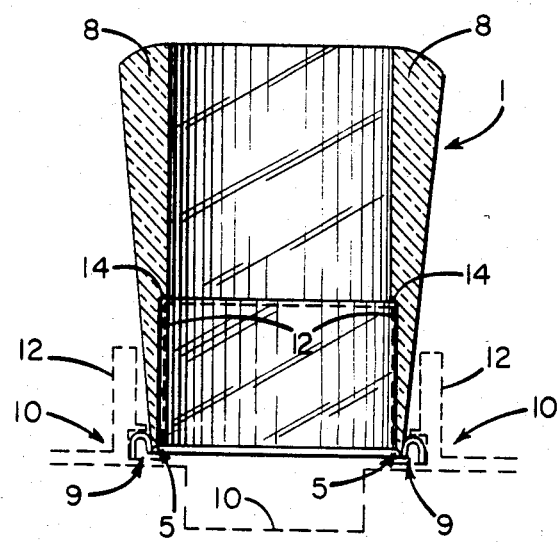
FIG. 2 is a cross-sectional view of the preferred embodiment as employed during use.
Figure 3:
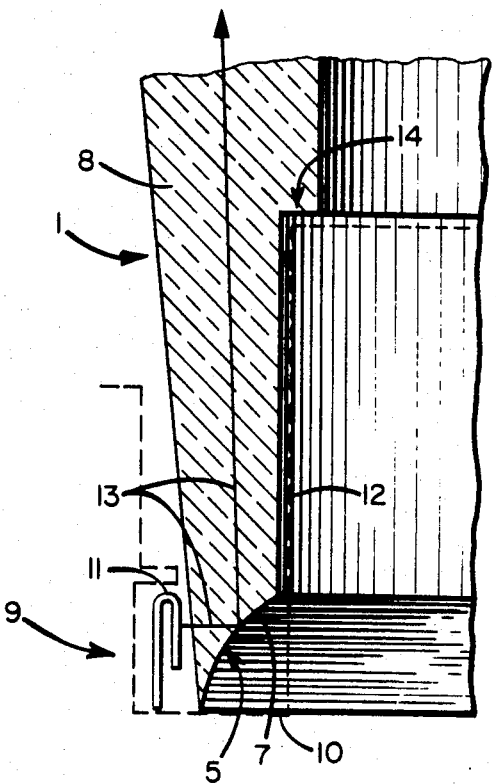
FIG. 3 is an isometrically enlarged view of a portion of FIG. 2.
Figure 3A:
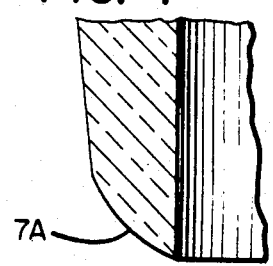
FIG. 3A shows an inwardly viewing counterpart to FIG. 3

Referring to FIGS. 2 and 3 the first annular end surface 5 is more clearly shown as having a conical or spherical surface 7 extending between the inner side wall 3 and the outer side wall 4 of the cylinder 1. The conical or spherical surface 7 may face inwardly toward the cylinder's central longitudinal axis, as appears in FIG. 3, or may face outwardly away from the cylinder's central longitudinal axis as shown in FIG. 3A if desired. The conical or spherical surface 7 functions as an optical surface to reflect light rays 13 through the solid cylinder wall 8 towards the second annular end surface 6. An inwardly sloping conical or spherical surface 7, as appears in FIGS. 2 and 3, reflects images 13 of the internal cylindrical surface 9 adjacent to and substantially at right angles to the outer side wall 4; an outwardly sloping conical or spherical surface 7A as shown in FIG. 3A will reflect images of an internal cylindrical surface adjacent to and substantially at right angles to the inner side wall 3. The sloping conical or spherical surface 7 is preferably slightly concave in shape and in FIG. 3, formed as a lens segment, for instance, by grinding and polishing the surface of the sloping edge with a spherical ball bearing. The surface 7A is preferably convex and formed as a lens segment, for instance, by grinding and polishing of the surface 7A with the inner spherical surface of a spherical cup.

Referring to FIGS. 2 and 3, the lens of the present invention is shown in a typical use. The first annular end surface 5 of the cylinder 1 has been inserted into the recess between cylindrical shells 12 of a coaxial cable connector 10 to permit viewing of an obscured internal cylindrical surface 9 with pins 11 disposed thereon. Ambient light enters through the cylinder's central aperture 2, the outer and inner side walls 3 and 4 and end surface 6 to illuminate the pins 11. Image light 13 from the pins 11 is reflected and focussed by the inwardly sloping concave conical surface 7 in conjunction with the second annular end surface 6.

Figure 4:
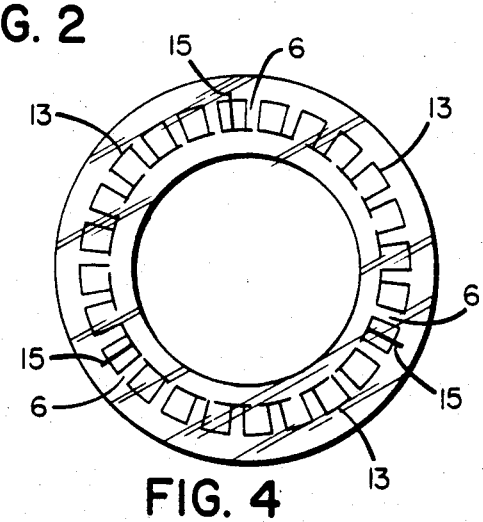
FIG. 4 is a view of the viewing end of the preferred embodiment as placed in FIG. 2, showing the image of the internal cylindrical surface thus seen by the viewer.

Referring to FIG. 4, light 13 is shown as a projected image through the second annular end surface 6, as typically seen by the viewer. The second annular end surface 6 is an optically finished surface which permits focused viewing of the reflected images 13. The surface of the second annular end 6 may be planar or convex in shape, and the curvatures of surfaces 6 and 7, in conjunction with the length of cylinder 1, may be chosen to provide magnification depending on the users preference. Either shape provides an annular optical surface suitable for viewing the internal region 9 in all directions simultaneously, a three hundred sixty degree view.

The cylinder 1 may be placed between the coaxial circular walls 12 at varying depths to view different portions of region 9. This is achieved by adjusting the depth of cylinder 1 insertion, the image light 13, reflected through the cylinder and appearing at the second annular end surface 6, may be thus received from different depths within the recess provided between shells 12.

As appears in FIGS. 2 and 3, when the pin 11 or internal cylindrical surface 9 to be inspected is at a known depth or distance, the present invention may include a positioning annular ledge 14 as part of the cylinder wall 3. This positioning annular ledge 14 permits the inspection lens to be placed between the coaxial circular walls 12 at a predetermined depth by engaging the inner shell 12 as a stop to provide a clear, focused image of a predetermined portion of the internal region 9.

Another feature of the present inspection lens is the instrument access provided by the large central aperture 2. Various instruments or tools can be inserted through the central aperture 2 of the cylinder 1 and used in an intended manner on elements near or in view of the sloping optical edge 7. Such an ability may find particular utility in medical applications where a lens of the type of the present invention can be inserted into a body opening to view edges thereof while instruments are passed through the lens aperture.

As an additional feature in the application of the present inspection lens, markings 15 (FIG. 1) may be placed on either the inner side wall 3 or the outer side wall 4 adjacent to the sloping optical surface 7. As appears in FIG. 4, these markings 15 will be visible to the viewer at the second annular end surface 6 and will serve to measure the angular distance between pins 11, or other components, or to verify the thicknesses and alignment of individual pins 11 disposed upon the internal cylindrical surface 9. Radial Scale markings may also be applied to the surface 6.

The above embodiments are presented solely as examples, the scope of the invention being defined in the following claims.

What is claimed is:

1. An inspection lens for viewing a circumferentially disposed region within an internal, confined area of a structure of the type having inner and outer coaxial surfaces that form a narrow cylindrical passage, said lens comprising:

an optically transparent tubular hollow cylinder having a central aperture therethrough surrounded by an inner sidewall, an outer sidewall, and first and second generally annular end surfaces;

said cylinder being elongate in the direction parallel to said inner sidewall and said outer sidewall;

said cylinder having a tapered outer wall to provide a thinning towards the end of the cylinder having said first annular end surface to permit a portion of said hollow cylinder having said first annular end surface to fit to varying depths between the inner and outer surfaces of said structure while a further portion of said hollow cylinder having said second annular end surface projects beyond said cylinder passage;

said first annular end surface providing a focusing and magnifying function, said first annular end surface comprising a lens having in cross-section a curved, sloping optical surface extending between the inner and outer sidewalls for reflecting and focusing an image of said circumferentially disposed region at a predetermined distance from said first annular end surface through said transparent hollow cylinder toward said second annular surface;

said second annular surface including an optical surface permitting focused viewing of said reflected image therethrough.

2. An inspection lens as recited in claim 1 wherein the sloping optical surface is concave facing inwardly toward the axis of said cylinder.

3. An inspection lens as recited in claim 1 wherein the sloping optical surface is convex facing outwardly away from the axis of said cylinder.

4. An inspection lens as recited in claim 2 or 3 wherein said sloping optical surface is spherical.

5. An inspection lens as recited in claim 1 wherein the cylinder expands in transverse thickness between the first and second end surfaces.

6. An inspection lens as recited in claim 1 wherein said inner sidewall includes a lower hollow portion which is enlarged to form a positioning annular ledge.

7. An inspection lens as recited in claim 1 wherein graduated scale markings are disposed on a cylinder side wall in a position adjacent to the sloping optical surface.

8. An inspection lens as recited in claim 1 wherein graduated scale markings are disposed as radial lines on the second annular surface.

9. An inspection lens as recited in claim 1 wherein said sloping optical surface and second annular end surface are provided with curvatures which are chosen in combination to provide a selected magnification over a range from greater than, to less than 1.

10. An inspection lens as recited in claim 2 or 3 wherein said sloping optical surface is toroidal.

* * * * *

UNITED STATES PATENT AND TRADEMARK OFFICE
CERTIFICATE OF CORRECTION

PATENT NO. : 4,511,222

DATED : April 16, 1985

INVENTOR(S) : Marvin A. Biren

It is certified that error appears in the above-identified patent and that said Letters Patent is hereby corrected as shown below:

Column 1, line 28 "Troeo" should read -- Froio --.

Column 4, line 16 "cylinder" should read -- cylindrical --.

Signed and Sealed this

Twenty-third Day of September 1986

[SEAL]

Attest:

DONALD J. QUIGG

Attesting Officer

Commissioner of Patents and Trademarks